June 22, 1926.
G. E. RICE ET AL
SOLID FUEL
Filed Nov. 2, 1925
1,589,561
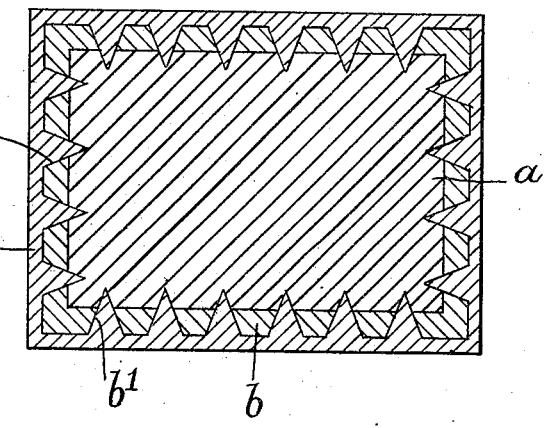
Inventors
George Eugene Rice, and
Elizabeth Jane Johnston
by Knight B.
attorneys Patented June 22, 1926.

1,589,561

UNITED STATES PATENT OFFICE.

GEORGE EUGENE RICE, OF LONDON, AND ELIZABETH JANE JOHNSTON, OF PADDINGTON, ENGLAND.

SOLID FUEL.

Application filed November 2, 1925, Serial No. 66,347, and in Great Britain November 3, 1924.

The invention relates to that kind of solid fuel block having an inner core and two coverings thereon.

According to the present invention the block is made of the following materials:— chalk, preferably Kentish chalk, coal dust, ground spent oil shale, a magnesium salt, preferably magnesium carbonate, a crude petroleum jelly, preferably mineral lard, and sea water.

The core is prepared as follows:—A magnesium salt, for instance, magnesium carbonate, is added to sea water in the proportion of one level tea-spoon of salt to each two gallons of sea water and allowed to stand for at least twenty-four hours.

Seventy five per cent by weight of coal dust is then mixed with twenty five per cent of chalk, and sufficient boiling sea water prepared as referred to above, is added to form a stiff paste. This mixture is then brought to boiling point and placed into moulds of any desired shape and size, parallelopiped for preference.

The blocks are put aside to cool and set for at least forty-eight hours.

These blocks are then evenly covered with chalk made into a thick paste with the prepared sea water referred to above, and holes are formed through this inner covering penetrating into the inner core. The number of holes should be as many as possible without unduly weakening the block. The block is then allowed to set and harden.

To prepare an outer covering thirty-six per cent by weight of coal dust twelve and a half per cent of chalk and fifty per cent of ground spent oil shale are thoroughly mixed together. Prepared sea water, as referred to above, is then added as for the inner block, and one and one half per cent of a crude petroleum jelly, preferably mineral lard, is made hot and thoroughly incorporated.

The block, consisting of the inner block and inner covering, is then covered in such a way that the holes are filled in with the last described mixture and the whole block has a thin skin of this outer covering material.

The complete block is then dried in a warm atmosphere and is ready for use.

The accompanying drawing is a section and shows one form of finished block. $a$ represents the core, $b$ the inner covering and $c$ the outer covering. Holes $b^1$ are formed through the inner covering $b$ and enter the core $a$. These holes $b^1$ are filled with part of the outer covering $c$.

This fuel will be found to burn without smoke and will give off great heat.

What we claim as our invention is:—

1. A solid fuel consisting of a core composed of coal dust, chalk, a salt of magnesium and sea water, surrounded by an inner covering of chalk, a salt of magnesium and sea water, and having an outer covering composed of chalk, coal dust, ground spent oil shale, a crude petroleum jelley, a salt of magnesium and sea water substantially as set forth.

2. A solid fuel consisting of a core composed of coal dust, chalk, magnesium carbonate and sea water, surrounded by an inner covering of chalk, magnesium carbonate and sea water and having an outer covering composed of chalk, coal dust, ground spent oil shale, a crude petroleum jelly, magnesium carbonate and sea water, substantially as set forth.

In witness whereof we have set our hands.

GEORGE EUGENE RICE.
ELIZABETH JANE JOHNSTON.